Dec. 10, 1940.  A. G. SHERMAN ET AL  2,224,164
ADJUSTABLE BROILER SHELF
Filed Oct. 3, 1938   2 Sheets-Sheet 1
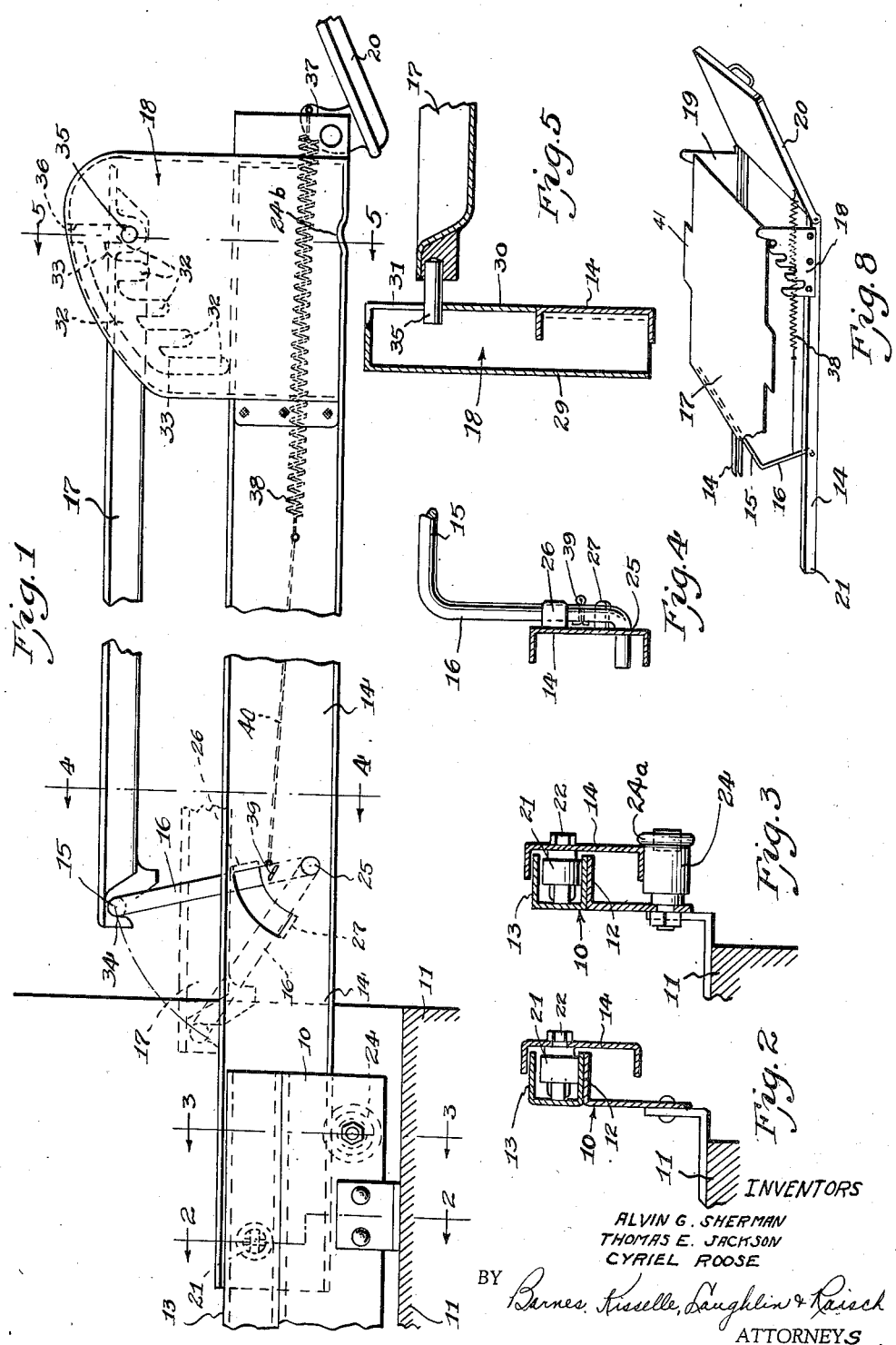
INVENTORS
ALVIN G. SHERMAN
THOMAS E. JACKSON
CYRIEL ROOSE
BY Barnes, Kisselle, Laughlin & Raisch
ATTORNEYS Dec. 10, 1940.　　　A. G. SHERMAN ET AL　　　2,224,164
ADJUSTABLE BROILER SHELF
Filed Oct. 3, 1938　　　2 Sheets-Sheet 2
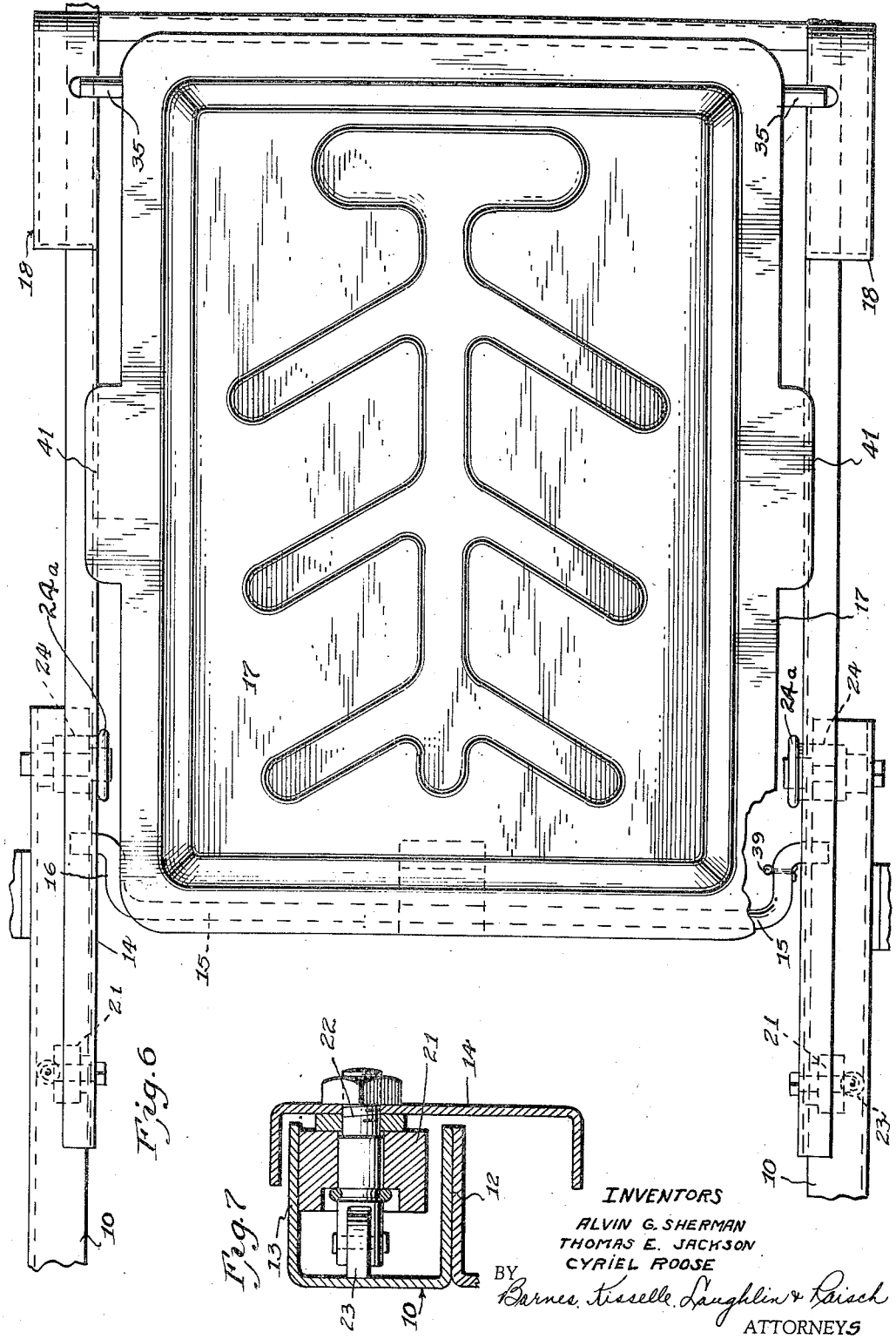
INVENTORS
ALVIN G. SHERMAN
THOMAS E. JACKSON
CYRIEL ROOSE
BY Barnes, Kisselle, Laughlin & Raisch
ATTORNEYS Patented Dec. 10, 1940

2,224,164

UNITED STATES PATENT OFFICE 2,224,164

ADJUSTABLE BROILER SHELF

Alvin G. Sherman, Grosse Pointe, and Thomas E. Jackson and Cyriel Roose, Detroit, Mich., assignors to Sherman-Jackson-Roose Company, Detroit, Mich., a corporation of Michigan Application October 3, 1938, Serial No. 232,970

7 Claims. (Cl. 126—340)

This invention relates to an adjustable broiler pan support.

This invention has particularly to do with that type of broiler pan support which is pivoted to the stove or to a frame in the stove so that it may be raised or lowered in relation to an overhead burner in the broiling chamber of the stove. One of the objects of the invention is to provide an adjustable broiler and which is more readily moved from one position to another than previous supports, and which is simpler in construction and operation.

Another object of the invention is to provide an adjustable broiler support which does away with the necessity of spring members located near the pan. In previous designs considerable difficulty has been had with spring members for locking levers and the like, which lose their temper after being subjected for a short time to the heats of the oven. The present invention contemplates a design in which spring trouble has been eliminated by reason of a novel combination with standard stove construction.

An additional object of the invention is to provide a broiler pan support which needs no auxiliary frame and in which the broiler pan itself is supported only at the front and rear edges.

Other objects of the invention have to do with details of the support which permit the pan to be readily moved in and out of the oven. A further object of the invention has to do with the supporting arrangement whereby certain parts of the pan serve, not only as a support but, also, as a guide during an adjusting movement thereof.

Other objects and features of the invention have to do with details of construction and operation which will be further brought out in the following description and claims.

In the drawings:

Fig. 1 is a side elevation of the invention illustrating the support in a position withdrawn from the broiling chamber.

Figs. 2, 3, 4 and 5 are detail section views taken on the corresponding section lines of Fig. 1.

Fig. 6 is a plan view of the broiler pan.

Fig. 7 is an enlarged view of a detail of sliding arrangement of the pan support.

Fig. 8 is a perspective view of the broiling pan support omitting certain of the details but illustrating the general features thereof.

Referring to the drawings, in Fig. 6 horizontal, oppositely positioned track members are shown at 10. These track members are mounted in the side walls of a broiler chamber in a stove unit (not shown). A vertical section of these track members is shown in Figs. 2 and 3. The base of the stove is shown at 11. It will be seen that the track members 10 have horizontal portions 12 and 13 which form a groove. Referring to Fig. 8, the broiler support contemplated by the present invention consists generally of spaced parallel slide members 14, an inverted U-shaped bar 15, extending between said slide members and having leg portions 16, a pan 17, and upright members 18 and 19 at each side of the front end of the slides 14. A door 20 connects the front ends of the slides and is used as a closure member for the broiling chamber of the oven unit.

At the rear end of the slide members 14 is mounted a roller 21 on a stud 22 (Figs. 2, 3 and 7). The roller 21 is adapted to extend into the groove formed between the horizontal portions 12 and 13 of the track members 10. As shown in Fig. 7, the stud 22 mounted on the slide member 14, projects into this groove and has mounted at its inner end, on a vertical axis, a roller 23 which contacts the vertical wall of the track 10 to insure an easy rolling of the slide members 14 in the track. At the front end of the track members 10, located beneath the horizontal portion 12, is a roller 24 mounted on a horizontal axis and adapted to support the slide members 14 (Fig. 3). The inner end of the roller 24 has a rim 24a which serves as a guide for the slides 14. Slide members 14 each have a circular depression 24b adapted to cooperate with the rollers 24 to position the slides in the broiler chamber.

Referring to Figs. 1 and 4, it will be seen that the legs 16 of the bar 15 are pivoted in the slide members 14 at 25. Lugs 26 and 27 are struck from the walls of the slide 14 to limit the pivoting movement of the bar 15.

Considering now the upright members 18 and 19, a cross section of upright 18 is shown in Fig. 5. The uprights consist preferably of a sheet metal box which is mounted on the forward end of the slide members 14 and which has an outside face 29 which is closed. The inside face 30 of the box 18 has an arcuate opening 31 with its lower edge provided with notches 32. The bases of these spaced notches 32 are located on an arc which has a radius substantially equal to the length of the leg members 16 of the bar 15. The center of the arc is located relative to the bottom of the slide member 14 at the same place as the legs 16 are pivoted. The sides of the notches 32 are substantially vertical except that the forward sides curve at the top as shown at 33. It will be seen that the top of the upright members 18 is preferably curved substantially as the opening 32.

The outside wall 29 of the uprights 18 and 19 has no particular function except to provide a finished and neat appearance.

At the rear edge of the pan 17 and on the lower surface is a notch 34 adapted to receive the bar member 15 so that the pan member may be supported thereon. Extending perpendicularly from each side of the pan 17 at the front portion are studs 35 which are dimensioned to be received by the notches 32. An opening 36, joining the top of the opening 32, admits the studs thereto.

The door 20 is pivoted on lugs 37 and springs 38 at each side thereof urge the door to its closed position. The springs 38 are anchored at one end to the lugs 37 on the door 20 and at the other end to the cross bar 15. This is accomplished by reason of cotter pins 39 which are located in the legs 16 of the bar 15, Figs. 4 and 6. A tie bar 40 extends between pins 39 and springs 38. Handles 41 are provided on each side of the pan member 17 to facilitate removal thereof from the adjustable supports. When the pan member 17 is removed from the supports the bar 15 will be raised by the springs 38 to the full line position shown in Fig. 1. When the pan is to be inserted, the door 20 and the slides 14 are withdrawn from the oven and the notch 34 on the rear edge of the pan is hooked over the bar 15. The lugs 35 are then lowered through the openings 36 and the pan is free to swing vertically to any position desired.

In Fig. 1 the top position of the pan is in its full position so that the lugs 35 are in the top notches 32. To move the pan to a lower position, it is necessary only to lift slightly the forward edge of the pan and exert a slight backward force. The lugs 35 will then contact the top edge of the arcuate opening 32 which will serve as a guide for the movement of the pan. At any point along the arcuate path from the top to the bottom notch, the forward portion of the pan may be lowered so that the lugs engage one of the notches 32. In raising the pan, the forward edge is lifted and pulled toward the operator.

It will thus be seen that the adjustment of the pan 17 is accomplished without the necessity of a complicated latch mechanism and without the need of springs which will be subjected to the heat of the broiling oven. The springs 38 acting on the bar 15 serve to move the bar 15 to its top position when the pan is removed, thus facilitating replacing of the pan when such is desired. The springs 38 also aid in lifting the pan when it is being adjusted. Failure of one spring 38 will leave the other still acting on the bar 15. If both springs 38 fail, repair will be necessary in order that the door 20 remain closed. Repair of either spring 38 will automatically replace the spring action on the bar 15.

What I claim is:

1. An adjustable pan support for a heating chamber having a source of heat comprising a pair of spaced members to be supported in said chamber, means pivoted on each of said members for directly supporting an edge of a pan, one or more upright members mounted at the forward end of said spaced members, said one or more uprights having vertical notches therein, the bases of said notches being spaced on a curve substantially similar to the arc described by said means when pivoted, a pan to be directly supported at one edge on said means, and means extending rigidly from another portion of said pan for engaging said vertical notches in said one or more upright members.

2. An adjustable pan support for a heating chamber having a source of heat comprising a pair of spaced members to be supported in said chamber, a bar extending between said members for directly supporting an edge of a pan, said bar being pivoted on said members, upright members mounted at the forward end of said spaced members, said uprights having vertical notches therein connected by a common curved opening, the bases of said notches being spaced on a curve substantially similar to the arc described by said bar member when pivoted, a pan to be directly supported at one edge on said bar, and means extending rigidly from another portion of said pan for engaging said vertical notches in said upright members.

3. An adjustable broiler pan support for a stove having a broiler chamber with an overhead burner, said support comprising parallel spaced members adapted to be supported in said chamber, a bar pivoted on said members whereby the top of the bar is horizontal and may be moved to different levels, and oppositely positioned upright members located at the forward end of said spaced members, said upright members comprising a sheet metal wall provided with a curved opening in the bottom edge of which are spaced notches on an arc having a radius substantially equal to the swinging radius of the bar, a pan member having a notch in its under surface for engaging said bar, and supporting studs extending from opposite sides of a portion of said pan for engaging said notches, said studs being adapted to be received at different levels by said notches and to be guided between said notches by said curved opening.

4. An adjustable broiler pan support for a stove having a broiling chamber with an overhead burner, said support comprising parallel spaced members adapted to slide in the said chamber, a bar pivoted on said members whereby the top of the bar is horizontal and may be rotated to different levels, and oppositely positioned upright members located at the forward end of said slide members, said upright members comprising a box having an inner sheet metal wall provided with a curved opening in the bottom edge of which are spaced notches on an arc having a radius substantially equal to the swinging radius of the bar, a pan member arranged to be supported at one edge by said bar, and supporting studs extending from opposite sides of the front portion of said pan for engaging said notches, said studs being adapted to be received at different levels by said notches and to be guided between said notches by said curved opening.

5. An adjustable pan support for a stove having a broiling chamber, said support comprising spaced members adapted to slide in corresponding members of said chamber and connected at the outer ends by a pivoted panel adapted to serve as a closure member for said chamber, means on the back ends of said spaced support members having a limited pivotal movement thereon, spring means acting on said means and said closure member for drawing the same toward vertical position, one or more upright members mounted at the forward end of said support slides having notches therein at different levels, a broiler pan shaped at one edge to receive and be supported by said pivoted means, and means on said pan for engaging notches in said one or more uprights whereby said pan may be easily adjusted vertically.

6. An adjustable broiler pan support for a stove having a broiling chamber with an overhead burner and oppositely positioned slides, said support comprising parallel spaced slide members adapted to slide in corresponding members of said chamber, rollers mounted on horizontal and vertical axes on said slide members for engaging the surfaces of said stove slides, a bar pivoted at each end on said slide members whereby the top of the bar is horizontal and may be moved to different levels, and oppositely positioned upright members located at the forward end of said slide members, said upright members comprising a sheet metal wall provided with a curved opening in the bottom edge of which are spaced notches curved on an arc having a radius substantially equal to the side members of the bar, a pan member having a notch in one portion for engaging said bar, and supporting studs extending from each side of another portion of said pan for engaging said notches, said studs being adapted to be received at different levels by said notches and to be guided between said notches by said curved opening.

7. An adjustable pan support for a heating chamber having a source of heat, comprising a support mounted in said chamber, a pan to be supported, means mounted at one portion on said support for directly and movably supporting an edge of the pan to permit an arcuate motion of said edge, one or more upright members mounted at another portion of said support, said one or more upright members having substantially vertical notches therein, the bases of said notches being spaced on a curve substantially similar to the arc described by said edge of said pan, and means extending rigidly from another portion of said pan for engaging said vertical notches in said one or more upright members, whereby said pan may be shifted to different levels relative to said support.

ALVIN G. SHERMAN.
THOMAS E. JACKSON.
CYRIEL ROOSE.